United States Patent
Cheney

[15] 3,700,150
[45] Oct. 24, 1972

[54] METHOD AND APPARATUS FOR FRACTURING METAL

[72] Inventor: Raymond E. Cheney, Niwot, Colo.

[73] Assignee: International Business Machines Corporation, Armonk, N.Y.

[22] Filed: June 8, 1971

[21] Appl. No.: 151,028

[52] U.S. Cl. .................... 225/1, 83/13, 83/701, 225/93, 225/103, 225/105
[51] Int. Cl. .............................. B26f 3/00
[58] Field of Search ...... 225/1, 105, 103, 93; 83/701, 83/13

[56] References Cited

UNITED STATES PATENTS

| | | |
|---|---|---|
| 3,157,329 | 11/1964 | Gorter..................225/93 |
| 3,172,588 | 3/1965 | Bertold et al.............225/93 |
| 3,189,238 | 6/1965 | Sherrill....................225/1 |
| 3,595,453 | 7/1971 | Sherry......................225/1 |

Primary Examiner—Frank T. Yost
Attorney—Hanifin and Jancin and Francis A. Sirr

[57] ABSTRACT

Thin metallic material is selectively cut by apparatus which subjects the material to complementary alternate displacement of a few microinches in a direction normal to its generally flat planar surface, the material stresses thus generated causing the metal to change state and fracture along the line of alternate displacement, the change in state occurring without the loss or distortion of material at the fracture.

7 Claims, 2 Drawing Figures

3,700,150

METHOD AND APPARATUS FOR FRACTURING METAL

BACKGROUND AND SUMMARY OF THE INVENTION

This invention pertains to the general field of metal working and treatment by the use of a non-cutting work modifying means in the form of a reciprocating tool.

The prior art relating to this general field discloses the use of vibratory energy to cut materials. Ultrasonic drilling is an example of such prior art. In this art, the drilling operation occurs with the drill in contact with the material, and material is removed when the drill is energized by an ultrasonic driver. Another example is in the use of a liquid medium and the removal of material by heat and cavitation which occurs when waves of ultrahigh frequency are focused on the submerged material to be cut.

The present invention provides a means whereby metal can be cut, to form a physical discontinuity interface therein, without accompanying removal of metal at the interface, and without deforming the metal at the interface. In practicing the present invention, the metal is subjected to complementary alternating force with the resulting stress causing the material to fatigue, work-harden or shear at this interface. The phenomena by which the discontinuity occurs is not fully understood. However, the environment established at the interface by the method and apparatus of the present invention is believed to produce a material stress which is less than that necessary to cause the material to yield. Thus, no plastic deformation occurs and the interface is sharply defined by sharp cleavage with no edge distortion.

In accordance with the present invention, the complementary physical displacement at the interface is very small as compared to the thickness of the metal. Thus, material distortion, which usually accompanies a punch-and-die method, does not occur and there is no need for secondary operations such as shaving, broaching or sizing. The present invention provides ultra precision blanking in a single operation.

More specifically, the present invention utilizes complementary reciprocating anvils or dies which impart a desired shape or form to the resulting material interface. These are driven through a range of a few microinches, in complementary fashion, by driver means, such as a pair of piezoelectric drivers. As a result, the dies experience very little wear.

The foregoing and other features and advantages of the invention will be apparent from the following more particular description of the preferred embodiments of the invention, as illustrated in the accompanying drawing.

DESCRIPTION OF THE PREFERRED EMBODIMENT

Figure 1:
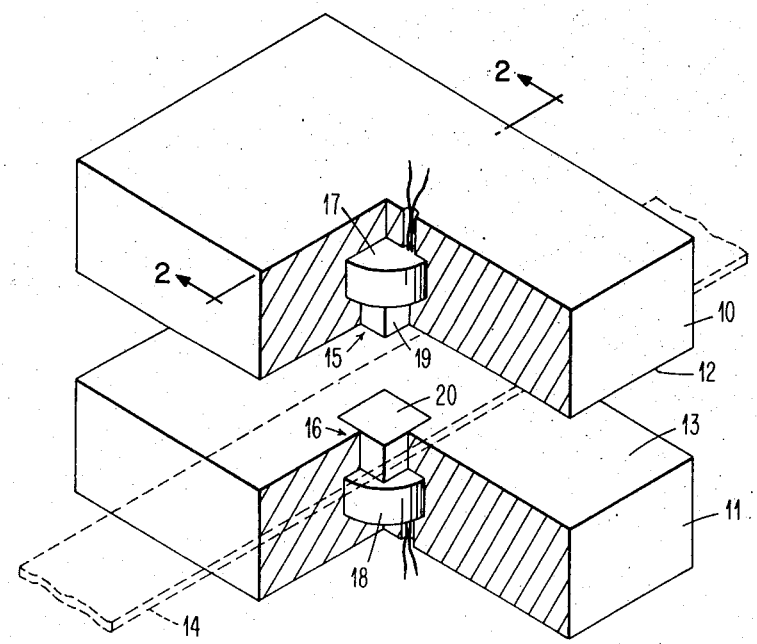
FIG. 1 is an exploded diagrammatic view of apparatus embodying the present invention.
Figure 2:
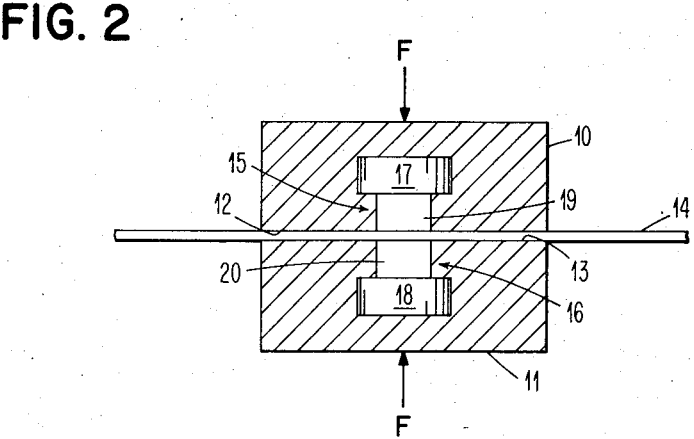
FIG. 2 is a section view of the apparatus of FIG. 1, showing the apparatus assembled and holding a strip of metal to be cut.

Referring to FIG. 1, this view shows, in simplified form, a fixture comprising a pair of mating metal blocks 10 and 11 whose mating surfaces 12 and 13 are machined to close tolerance and are adapted to imprison or clamp therebetween a strip of ductile material 14, for example, Mu metal. As seen in FIG. 2, metal blocks 10 and 11 are held together or clamped by means of static clamping forces diagrammatically identified as force vectors F. The clamping and unclamping apparatus may take many forms and can be accomplished by actuating cams, hydraulic, pneumatic or other controllable forces. Each of these metal blocks includes accurately aligned and complementary hollow cavities or openings 15 and 16. As can best be seen in FIG. 2, each of the openings 15 and 16 holds electrical force transducers 17 and 18, in the form of piezoelectric crystals, and movable punch-like anvils or dies 19 and 20.

By way of example, blocks 10 and 11 may be formed of steel. The surfaces 12 and 13 adjacent openings 15 and 16 are hardened. The openings 15 and 16 may be chrome plated, and the anvils 19 and 20 may be formed of a ceramic material. The chrome-ceramic interface is selected to prevent fretting corrosion during operation of the apparatus.

The force transducers 17 and 18 may be magnetostrictive, piezoelectric, hydraulic or pneumatic drivers which generate a force. By way of example, the force may be in the range of up to 310 pounds per square inch and produce anvil movement in the range of from 5 to 200 microinches. In this example, metal strip 14 may be Hy Mu 80 as rolled, from 2 to 4 mils thick, and anvils 19 and 20 may be of square across section having ¼inch dimension, as measured in the plane of surfaces 12 and 13.

It has been found that by the use of the present invention, the material 14 at the interface of the two accurately aligned anvils 19 and 20 is alternately displaced normal to its general flat surface 12–13. This displacement may, for example, occur at a rate of 60 cycles per second. In the above-cited example, energization of the drivers was maintained for approximately 15 seconds. As a result, the material 14 which is contiguous with the outline of anvils 19 and 20 is successively displaced a distance less than the thickness of material 14, for example, a few microinches above and below the respective surfaces 12 and 13. The stresses thus generated cause material 14 to change state, to fracture or to form a physical discontinuity, without the loss of material, along the lines of alternate displacement defined by the cross-sectional shape of anvils 19 and 20. After energization of the drivers 17 and 18, strip 14 is removed and the square piece of material which has been severed or cut from the strip is removed, as by an air blast.

As essential feature of the present invention is that mating anvils 19 and 20 be positioned in alignment and have identical shapes.

In the preferred embodiment of the present invention, drivers 17 and 18 are energized in complementary fashion. Referring to FIG. 2, the energization of piezoelectric crystals 17 and 18 is such that when crystal 17 is expanding, crystal 18 is retracting. On the next half cycle of movement, crystal 18 expands and crystal 17 retracts. Within the teachings of this invention, anvil displacement distance, driver reciprocating frequency and the time period of driver energization can be varied to attain a desired quality cut at the discontinuity and/or to attain a desired production efficiency, as by reducing the time required to make a cut.

While the equal and opposite complementary force produced by crystals 17 and 18 is to be preferred, one of these crystals may be replaced by a resilient return pad, such as a hard rubber pad, which resists the movement of the one remaining transducer and returns the contiguous portion of material 14 to its original flat planar state as this transducer cyclically expands and retracts.

A further use of the present invention in the formation of micro-width discontinuities or gaps in metal, such as the magnetic metal My Mu 80, where a sheet or strip of this material, such as strip 14 of FIG. 1, has an edge portion thereof subjected to mating anvils which are shaped to produce a micro-width line-type discontinuity, fracture or gap in the material. This discontinuity changes the magnetic properties of the Hy Mu 80 material and this change in magnetic property facilitates the use of this material in magnetic read/write heads.

While the invention has been particularly shown and described with reference to preferred embodiments thereof, it will be understood by those skilled in the art that various changes in form and details may be made therein without departing from the spirit and scope of the invention.

What is claimed is:

1. The method of forming a physical discontinuity in a piece of ductile material comprising the steps of;
    clamping said piece of material in a fixture having a discontinuity whose outline defines the discontinuity to be formed in the material, and
    subjecting the material adjacent said discontinuity to a limited displacement force normal to the plane of said material to fatigue the material along the outline of the discontinuity in said fixture.

2. The method as defined in claim 1 wherein said force is a reciprocating force.

3. The method as defined in claim 2 wherein said reciprocating force produces equal displacement of said material adjacent said discontinuity normal to the plane of said material.

4. The method as defined in claim 3 wherein the displacement of said material adjacent said discontinuity is less than the thickness of said material.

5. The method as defined in claim 4 wherein said discontinuity is an opening, and including the step of removing the portion of the material as outlined by the fatigued portion to thus form the opening in the material.

6. In a cutting apparatus wherein the part to be cut is firmly held between two identical movable mating anvils which are movable generally normal to the surface of the part to be cut, said anvils being aligned on opposite sides of said part and having identical shapes which define the desired shape of the cut, the improvement comprising;
    a first and a second force transducer means, each of which is associated with one of said anvils, and
    energizing means coupled to actuate said force transducing means to produce equal complementary cyclic motion of said anvils, the distance of travel of said anvils being less than that required to cut completely through the part.

7. A cutting apparatus as defined in claim 6 wherein said first and second force transducing means are piezoelectric means, and said energizing means are electrical energizing means.

* * * * *